Figure 1:
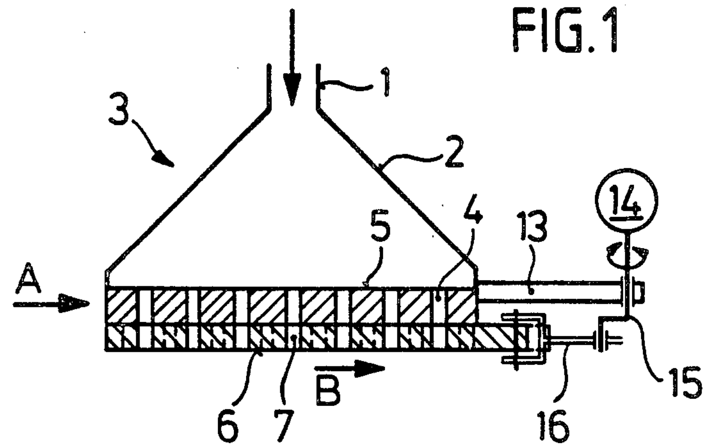

United States Patent [19]

Kube et al.

[11] Patent Number: 4,479,768

[45] Date of Patent: Oct. 30, 1984

[54] SEALABLE DISCHARGE DIE FOR THERMOPLASTIC

[75] Inventors: Wolfgang Kube, Ludwigshafen; Robert Kegel, Frankenthal; Guenter Valentin; Dieter Staufer, both of Ludwigshafen, all of Fed. Rep. of Germany

[73] Assignee: BASF Aktiengesellschaft, Ludwigshafen, Fed. Rep. of Germany

[21] Appl. No.: 489,498

[22] Filed: Apr. 28, 1983

[30] Foreign Application Priority Data

May 3, 1982 [DE] Fed. Rep. of Germany ... 8212640[U]

[51] Int. Cl.³ .............................................. B29F 3/08

[52] U.S. Cl. ................................ 425/192 R; 264/142; 425/198; 425/199; 425/311; 425/381; 425/465; 425/466

[58] Field of Search ............... 425/198, 199, 132, 186, 425/192 R, 465, 466, 381, 311; 264/142, 167

[56] References Cited

U.S. PATENT DOCUMENTS

| | | | |
|---|---|---|---|
| 827,444 | 7/1906 | Herbert, Jr. | 425/465 |
| 2,150,659 | 3/1939 | Santo | 425/192 R |
| 2,578,229 | 12/1951 | Clement et al. | 425/466 |
| 2,979,764 | 4/1961 | Andrew | 425/6 |
| 3,215,094 | 11/1965 | Oldershaw et al. | 425/466 |
| 3,469,281 | 9/1969 | Payne | 425/464 |
| 3,503,342 | 3/1970 | Ilines | 425/192 R |
| 3,600,751 | 8/1971 | Fairbanks | 425/381 |
| 3,973,890 | 8/1976 | Porter et al. | 425/311 |
| 4,279,579 | 7/1981 | Froescke | 425/132 |
| 4,313,327 | 2/1982 | O'Connor | 425/132 |

*Primary Examiner*—Jeffery Thurlow
*Attorney, Agent, or Firm*—Keil & Weinkauf

[57] ABSTRACT

A sealable discharge die for thermoplastics, comprising a housing, a dieplate which closes the latter except for perforations for discharge of the plastic melt in strands or filaments, and a perforated plate located immediately below or above this dieplate, one of the plates being slidable or rotatable and the perforated plate having orifices which can be brought into alignment with the perforations of the dieplate.

4 Claims, 2 Drawing Figures

1
3
2
14
5
4
13
A
15
B
6
7
16

1
2
3
A
5
4
13
14
15
16
B
6
7

4
10
5
8
8
11
7
6
9
12

SEALABLE DISCHARGE DIE FOR THERMOPLASTIC

The present invention relates to a sealable discharge die for thermoplastics.

In conventional discharge dies, the die housing can be isolated from the plastic melt feed by a sealing member. This has the following disadvantages:

If the discharge of melt is stopped by closing the sealing member, melt oozes from the die orifices.

When space has been created by such oozing, air can enter the housing and damage residual product, for example through oxidation, thereby adversely affecting product quality. For example in the case of nylons, where high condensation temperatures are employed, cracking of the product may occur if the condensation is carried out batchwise, necessitating frequent removal of the die and very troublesome cleaning thereof.

It is an object of the present invention to provide a sealable discharge die for thermoplastics which avoids these disadvantages.

We have found that this object is achieved by providing a sealable discharge die for thermoplastics which comprises a housing, a dieplate which closes the latter except for perforations for discharge of the plastic in strands or filaments and a sealing member for the discharge die, which member is formed by an additional perforated plate, which has orifices which can be brought into alignment with the perforations of the dieplate and is located immediately below or above the dieplate, one of the plates being slidable or rotatable and being connected to a drive for this purpose.

In an advantageous embodiment of the invention the drive for the slidable plate consists of a rocker hingedly engaging on the plate and an adjustment motor connected to the rocker via a crank, the stroke of the crank corresponding to the travel of the movable plate.

In a further embodiment of the invention, one of the plates has two mutually parallel undercuts so as to form guides for the other plate, and this other plate is pressed against the plate with the undercuts by means of springs which are supported against guide surfaces, with interposition of sliding members.

Figure 2:
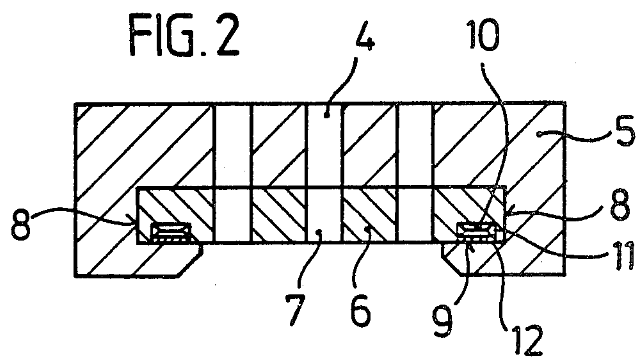

Further details and advantages of the novel discharge die may be seen from the following description of the example shown in the drawing, where FIG. 1 diagrammatically shows a lengthwise section of the discharge die, together with the drive for the adjustable perforated plate and FIG. 2 shows a cross-section of the dieplate and perforated plate viewed in the direction of arrow A in FIG. 1.

The conically flared housing 2 of the sealable discharge die 3 is provided with a feed nozzle 1 and to the housing 2 is welded a dieplate 5 provided with drilled holes or other suitable perforations 4 (FIG. 1). Immediately below is a slidable perforated plate 6 which serves as a sealing member; it has orifices 7 at the same spacing as those of the dieplate and—as may be seen in FIG. 2—is slidably or rotatably held and guided in two mutually parallel undercuts 8 of the dieplate. To allow the drilled holes 4 of the dieplate 5 to be shut off by sliding (in the direction of arrow B in FIG. 1) or rotating the perforated plate 6 (thereby bringing the latter into the position shown in broken lines, the distance between the drilled holes 4 in the dieplate must, in the sliding direction or the direction of rotation of the perforated plate 6, be greater than the diameter of the orifices 7 of the said plate. Moreover, the perforated plate must rest sealingly against the die-plate.

For the last-mentioned purpose, cup springs 10 are inserted between the perforated plate 6 and the guide surfaces 9 of the undercuts 8, which springs are held in recesses 11 of the perforated plate and are supported against the guide surfaces via sliding disks 12, so that the perforated plate is pressed against the dieplate.

To move the perforated plate 6, an adjustment motor 14 is provided on a holder 13 attached to the housing 2 and engages on the perforated plate 6 via a crank 15 which is connected to the motor shaft and acts on a rocker 16 hingedly connected to the perforated plate. The drive motor used is preferably a pneumatic or hydraulic motor. The crank stroke corresponds to the linear travel of the plate, so as to impose the appropriate limit on the end positions of the plate.

If on the other hand the perforated plate were mounted rotatably on the dieplate, for example by means of a rotary pin, the motor shaft could, for example, directly exert its driving action on the perforated plate periphery via a friction wheel or gearwheel.

Of course, other suitable driving means can also be employed in place of the motor, for example pneumatic or hydraulic working cylinders which then engage directly on the perforated plate.

Of course different embodiments of the discharge die in respect of the two plates 5 and 6 are within the scope of the invention. For example, the perforated plate may be located above the dieplate, or the perforated plate may be static and the dieplate movable, and the orifices in the perforated plate may be greater than the perforations in the dieplate or have the same shape and size as the said perforations.

We claim:

1. An improved sealable discharge die for thermoplastics said discharge die comprising:

a housing;

a dieplate fixed to and closing said housing, said dieplate having a plurality of spaced perforations to permit the discharge of plastic strands from said housing; a sealing member plate slidingly held against said dieplate, said sealing member plate having a plurality of orifices which may be aligned with the perforations of said dieplate and the dimension of said orifices being less than the space between perforations of said dieplate whereby the sealing member plate may be moved to shut off said perforations and terminate said discharge of plastic strands; and springs positioned to contact said sealing member plate and urge same sealingly against said die plate.

2. The apparatus of claim 1, including drive means connected to reversibly move said sealing member plate.

3. The apparatus of claim 1, wherein said dieplate includes undercuts which form guide surfaces to slidingly hold said sealing member plate adjacent said die plate, and said springs are positioned between said guide surfaces and said sealing member plate.

4. The apparatus of claim 3, wherein the sealing member plate contains recesses opposite said guide surfaces and said springs are held in said recesses.

* * * * *